United States Patent [19]

Ito et al.

[11] Patent Number: 5,270,701
[45] Date of Patent: Dec. 14, 1993

[54] SERVICE PROCESSING SYSTEM WITH DISTRIBUTED DATA BASES

[75] Inventors: Atsushi Ito; Hikaru Yagi; Nobuo Furuya, all of Tokyo; Masanobu Fujioka, Saitama; Yoshikazu Ikeda, Tokyo, all of Japan

[73] Assignee: Kokusai Denshin Denwa Co., Ltd., Tokyo, Japan

[21] Appl. No.: 746,200

[22] Filed: Aug. 15, 1991

Related U.S. Application Data

[63] Continuation of Ser. No. 588,518, Sep. 25, 1991, abandoned, which is a continuation of Ser. No. 320,129, Mar. 7, 1989, abandoned.

[30] Foreign Application Priority Data

Mar. 8, 1988 [JP] Japan .................................. 63-52584

[51] Int. Cl.[5] .............................................. H01H 67/00
[52] U.S. Cl. ............................ 340/825.03; 340/825.52; 379/211
[58] Field of Search ....................... 340/825.03, 825.51, 340/825.52, 825.53; 379/210, 207, 211, 220, 221, 225, 230, 229; 364/200, 900, 137

[56] References Cited

U.S. PATENT DOCUMENTS

| | | | |
|---|---|---|---|
| 1,965,123 | 7/1934 | Kardorff | 379/211 |
| 2,312,385 | 3/1943 | Burgener | 379/211 |
| 3,959,600 | 5/1976 | Sousa | 379/211 |
| 4,436,963 | 3/1984 | Cottrell et al. | 379/211 |
| 4,723,272 | 2/1988 | Maat | 379/211 |
| 4,752,952 | 6/1988 | Konneker | 379/211 |
| 4,837,804 | 6/1989 | Akita | 379/211 X |

Primary Examiner—Ulysses Weldon
Attorney, Agent, or Firm—Armstrong, Westerman, Hattori, McLeland, & Naughton

[57] ABSTRACT

A service processing system has a plurality of service processing nodes each having a single local data base, and a plurality of exchanges each of which is coupled user terminals. Said service processing nodes are coupled with one another through communication lines. A query by a user terminal is transferred to a local data base through an exchange to which the user terminal belongs. When a response to the query is stored in that data base, said response is directly given to the exchange from said local data base. On the other hand, when the local data base does not store the response the query of the user terminal is transferred to another service processing node which is designated by the local data base through the communication line between the service processing nodes. The response obtained in said other service processing node returns to the first local service processing node. Thus, the service to a user terminal is carried out by using a plurality of distributed data bases, each of which stores only local data.

2 Claims, 4 Drawing Sheets

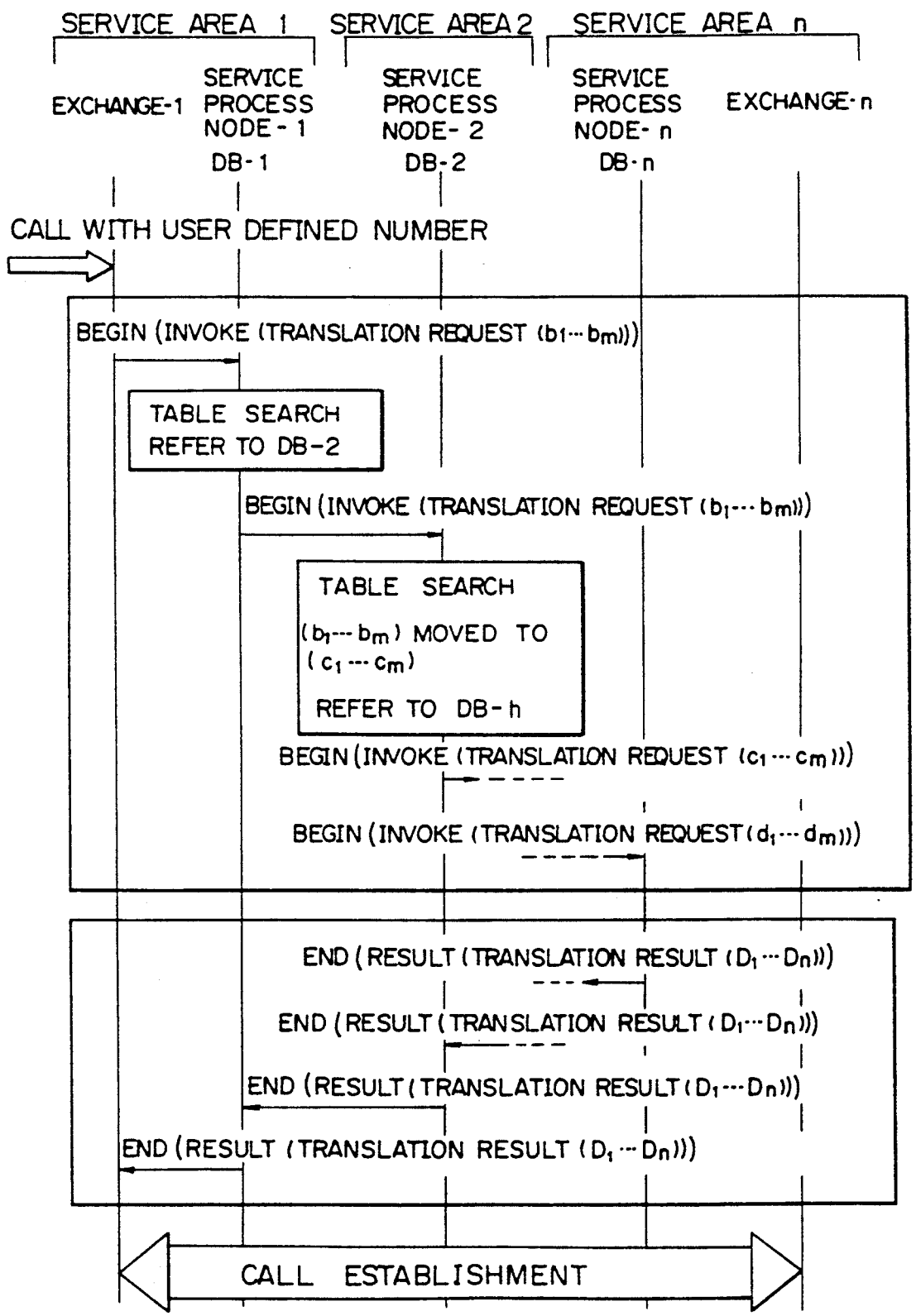

1

SERVICE PROCESSING SYSTEM WITH DISTRIBUTED DATA BASES

This application is a continuation of application Ser. No. 588,518 filed Sep. 25, 1991 now abandoned which is in turn a continuation of application Ser. No. 320,129 filed Mar. 7, 1989 now abandoned.

BACKGROUND OF THE INVENTION

The present invention relates to a service process system using distributed data bases, in which a plurality of service processing nodes each of those having the related small data base, and communication lines among the service processing nodes are provided. Each data base in a service processing node stores the information about service conditions, service items, user identifications, and/or directories for each user or user group. The information in each data base may be transferred to another data base through a communication line so that the service is provided to the user who belongs to said other service processing node.

FIG. 1 shows a conventional service processing network, in which the numerals 10a through 10g are exchanges, 12a through 12e are terminal devices, 14 is a service processing node, 16 is a data base coupled with said service processing node 14, and 18 is a service processing network.

As shown in FIG. 1, a single data base 16 which is coupled with the service processing node 14 is provided, and said data base 16 stores all the information which is supplied to the users 12a through 12e upon request.

When a terminal device 12a requires some service, the terminal device 12a is coupled with the data base 16 through the exchange 10a, the exchange 10b, and the service processing node 14, and obtains the necessary service information from the data base 16.

However, a prior service processing system of FIG. 1 has the disadvantages that data management is difficult since all the data are concentrated in the service processing node 14, a race condition might occur as the service traffic is dense since all the service calls are concentrated in a single service processing node 14, and thus, traffic in the communication line between the service processing node and the exchanges may become over-loaded.

SUMMARY OF THE INVENTION

The object of the present invention is to overcome the disadvantages and limitations of a prior service processing system by providing a new and improved service processing system.

It is also an object of the present invention to provide a service processing system which simplifies the data management in a data base, removes the race condition among the service requests, and decreases the traffic between the service processing node and the exchanges.

The above and other objects are attained by a service processing system with a plurality of distributed data bases having a plurality of service areas each having a single service processing node together with a single data base, at least one exchange coupled with said service processing node, and a plurality of user terminals coupled with one of said exchanges through a communication line; communication lines coupling said exchanges; other communication lines coupling said service processing nodes; said service processing node accessing a local data base in its own service area upon request by one of local user terminals, and obtaining a response to a query of said user terminal by retrieving said data base; wherein when no response exists in the local data base, which merely shows a data base which includes a response said service processing node transfers a query to another service processing node asking a response to the query, and said second service processing node response the query of the first service processing node through the communication line between the service processing nodes.

BRIEF DESCRIPTION OF THE DRAWINGS

The foregoing and other objects, features, and attendant advantages of the present invention will be appreciated as the same become better understood by means of the following description and accompanying drawings wherein;

FIG. 4 shows the access procedure to a data base according to the present invention.

DESCRIPTION OF THE PREFERRED EMBODIMENTS

Figure 1:
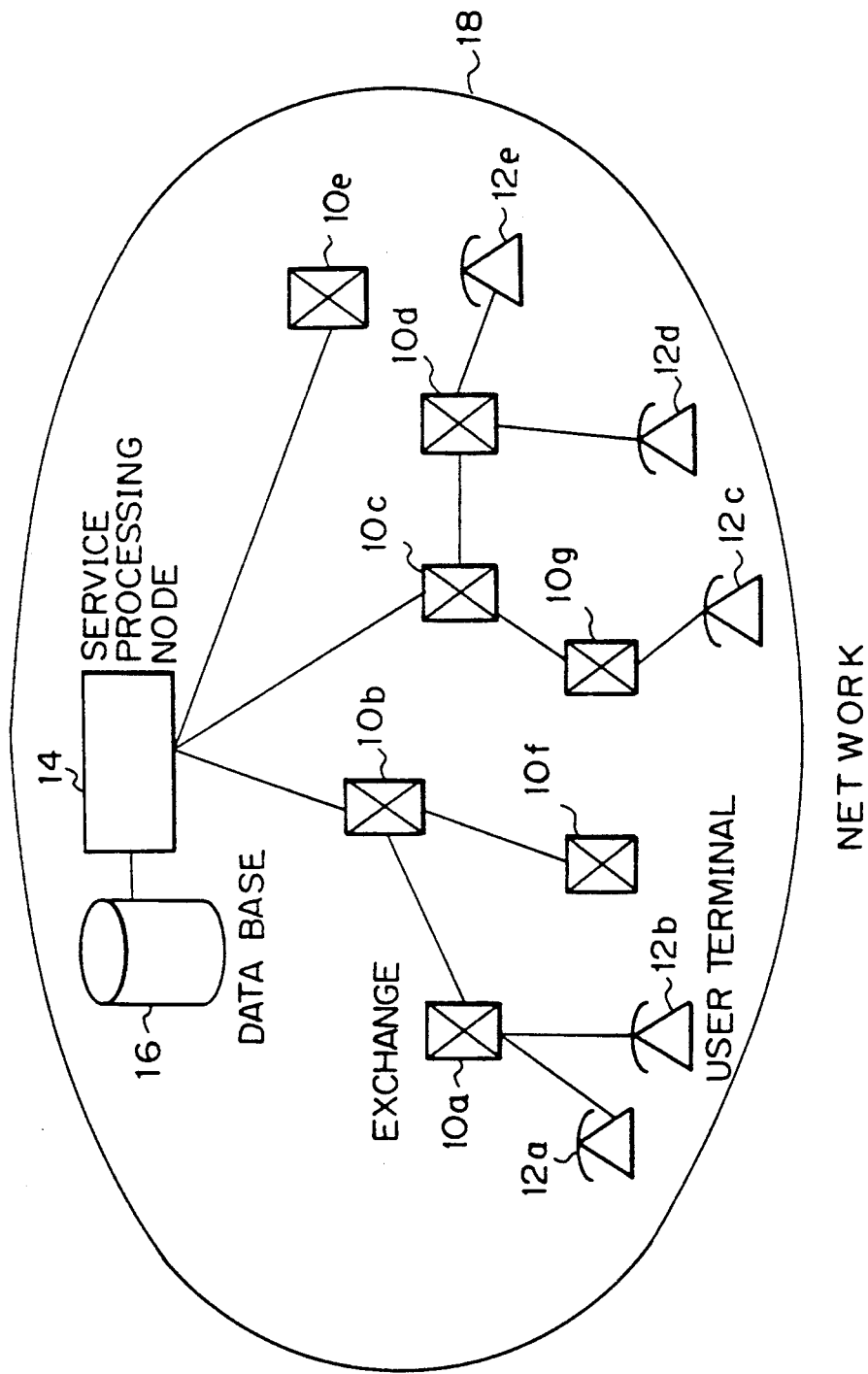
FIG. 1 shows a prior service processing system.
Figure 2:
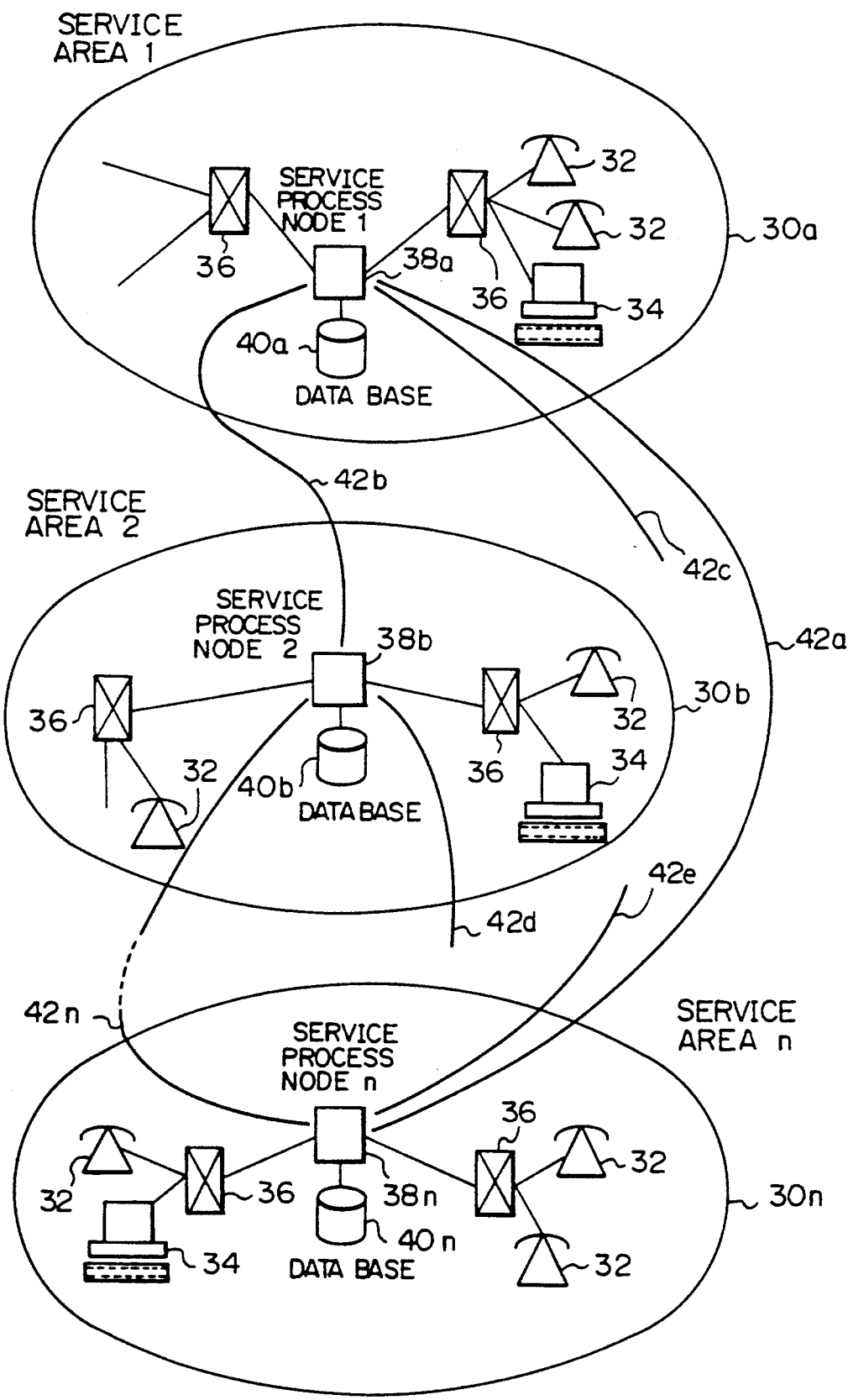
FIG. 2 shows a system diagram of a service processing system according to the present invention.
Figure 3:
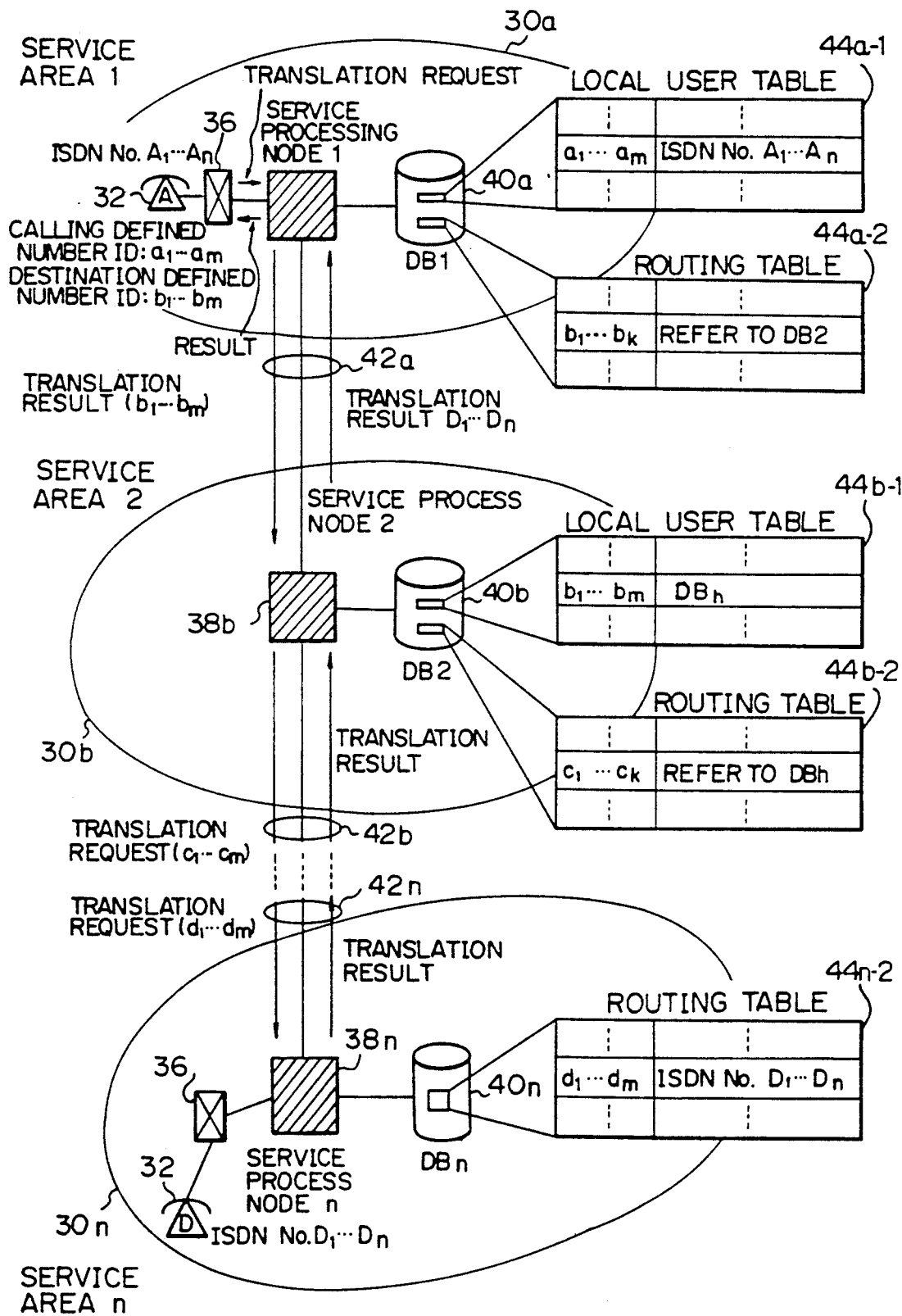
FIG. 3 shows the operation of the system of FIG. 2.

Now, the present invention is described in accordance with FIGS. 2 and 3.

In those figures, the communication network has a plurality of service areas 30a through 30n. Each service area has a single service processing node 38a (38b, 38n). The service processing node 38a has the related data base 40a, which stores the information relating to the own local service area 30a, and the information what service area has the data which the own data base 40a does not have. The communication lines 42a through 42n are provided to connect the service processing nodes in the service areas. Each service area is directly connected to other service areas by the lines 42a through 42n.

The numeral 32 is a telephone set, 34 is a personal computer. Those devices are user terminal devices which generate service requests, and/or provided with the service. The numeral 36 is an exchange. The numerals 38a through 38n are service processing nodes, and the numerals 40a through 40n are data bases having the information concerning the own local service area.

When the terminal device 32 (or 34) has a request of service, that request is transferred to the service processing node 38a through the exchange 36. If the data base 40a which is coupled with the service processing node 38a has the information which is requested by the terminal device 32, the service processing node 38a retrieves that information from the data base 40a, and transfers it to the terminal device 32 which requests the service. On the other hand, when the data base 40a does not have the information which the terminal device requests, the service processing node 38a transfers the request to another service processing node which has the information requested by the terminal device, through one of the communication lines 42a through 42n. Therefore, even if the local data base 40a has no information which the terminal device requests, the service processing node 38a can satisfy the request of the terminal device by using other service processing nodes.

FIG. 3 shows the practical embodiment of the present invention, in which a communication network is divided into a plurality of service areas 30a, 30b, ..., 30n each having a service process node 38a, 38b, ..., 38n, and the related data base 40a, 40b, ..., 40n, and the service process nodes 38a through 38n are connected to one another through a communication line 42a through 42n. Each service area 30a through 30n has at least one exchange 36 which is coupled with a user terminal 32 through a communication line. The exchanges in the network are coupled with one another through a communication line.

FIG. 3 is an embodiment that a user group with a plurality of user terminals is established in a network, and any member in the user group communicates with another member in the group with the specific numbering system (for instance, a shortened numbering system), the directory system (for instance, a name list of members of a user group) or the personal information system (for instance, the job career of a member, hobbies, sex etc.) With the directory system a user makes a call with a name, a position and/or a section of a callee in the group instead of a telephone number. With the personal information system a user makes a call with key words or sentences, which imply what he wants to know instead of a telephone number. The service based on that specific numbering system, the directory system and the personal information system is provided by the present service network.

In the following passages, a shortened numbering system is used as an example.

It is supposed that the exchange 36 in the service area 30a receives a call connection request by the user terminal 32 which has the calling identification $a_l..a_m$. The destination identification (called terminal) is $b_l..b_m$. The identifications $a_l..a_m$ and $b_l..b_m$ are shortened numbers, and are, for instance, *011, and *234, respectively. The symbol * at the head of the identification indicates that the number is the shortened number.

The exchange 36 which receives the shortened number has the service process node 38a in the service area 30a translating the shortened identification into the network number which is an ISDN (integrated service digital network) number in the embodiment.

The service process node 38a reads out the data base 40a which has a first table 44a-1 storing the user table in the local area, and the second table 44a-2 storing the routing table.

The first table 44a-1 shows that the identification $a_l..a_m$ corresponds to $A_l..A_n$ which is for instance 230-456-1234. The second table 44a-2 shows that the destination identification $b_l..b_m$ belongs to the service area 30b (DB2).

When a shortened identification has an area code, and a user identification, a keyword for reading out the routing table 44a-2 may only be the area code which is a part of the user identification. In the present embodiment, the destination identification is *234, in which it is supposed that the symbol * shows the shortened identification, the first number 2 shows the area code, and the other number 34 show the user identification in the service area designated by the area code 2. In the present embodiment, a part $(b_l..b_k)$ (=2) of the user identification is used as a keyword for reading out the routing table 44a-2.

Since the routing table 44a-2 shows that the destination identification $b_l..b_k$ belongs to the service area 30b (DB2), the service process node 38a asks the service process node 38b in the service area 30b to translate the destination identification $b_l..b_m$ to the network number.

The service process node 38b in the service area 30b reads out the data base 40b (DB2). The user table 44b-1 in the data base 40b (DB2) shows that the identification $(b_l..b_m)$ moves temporarily to $c_l..c_m$. Consequently, the routing table 44b-2 is read out, and it is found that the data base $DB_h$ should be read out for the identification $c_l..c_k$. Therefore, the service process node 38b asks the service process node $38_h$ (not shown) to translate the identification $c_l..c_m$.

The similar operation is repeated, and it is supposed that the service process node 38n in the service area 30n is asked to translate $d_l..d_m$ which corresponds to the first destination identification $b_l..b_m$. The data base 40n of the service process node 38n shows in the local user table 44n-2 that the shortened identification $d_l..d_m$ corresponds to the network number (ISDN number) $D_l..D_n$, which is for instance 987-654-4321.

The translated network number is transferred to the service process node which asks the translation. Finally, the service process node 38b receives the translated result $D_l..D_n$ from the data base $DB_h$, and the service process node 38b informs of the first service process node 38a the result.

Thus, the exchange 36 recognizes network numbers of both the calling user and the destination user, and therefore, the exchange connects the calling user ($A_l..A_n$) to the destination user ($D_l..D_n$).

As mentioned above, the exchange coupled with the calling user can receive the network numbers of both the calling user and the destination user by using the communication between the service process nodes.

It should be noted that each data base in each service area stores only the local information, and the index information which shows where the requested information exists. Therefore, the capacity of each data base may be small as compared with a prior art in which a single data base stores all the information.

As for the communication between an exchange and a service node, and between two service process nodes, the Common Channel Signaling System No.7 recommended by CCITT may be used. The Transaction Capabilities of Common Channel Signaling System No.7 is used for transferring a transaction in the present invention.

FIG. 4 shows the procedure between an exchange and a service process node, and also between two service process nodes by using said Transaction Capabilities.

In the figure, the symbol BEGIN and END show the start and end of a transaction respectively, between an exchange and a service process node, and/or between two service process nodes. The symbols INVOKE and RESULT show a query and a response, respectively. The INVOKE has the parameter identifying the operation. The operation in the INVOKE in the present embodiment is the number translation request (user identification). The RESULT has the parameter which is in the present embodiment the translated result (ISDN number).

The process in an exchange and a service process node which invoke a query (translation) is as follows.

1) Trigger of a query to a service process node;

The trigger of a query is that an exchange finds a destination shortened identification, and that a service process node finds that the response for the query belongs to another data base.

2) Generation of parameter to a service process node; The parameter in the present invention is the number translation request (user defined number).

3) Generation of query to a service process node; In the present embodiment, query=INVOKE (number translation request(user defined number).

4) Access to a service process node; In the present embodiment, Access=BEGIN(INVOKE(translation request(user defined number).

5) Waiting a response

6) Receive of access In the present embodiment, Access end=(END(RESULT(translation response number))).

7) Taking out a response In the present embodiment, Answer=(RESULT(translation result(ISDN number))

8) Taking out translation result; In the present embodiment, Translation result=ISDN number 9) If the response to an exchange or a service process node is necessary, the processes 5 and 6 in the response side are carried out.

The process in an exchange and a service process node which response a query is as follows.

1) Receive an access from an exchange or a service process node; In the present embodiment, Access=BEGIN(INVOKE(translation request (user defined number))).

2) Taking out a query to a service process node (data base); In the present embodiment, Query=INVOKE(translation request(user defined number)).

3) Taking out parameter to a service process node (data base); In the present embodiment, Parameter=translation request (user defined number).

4) Operation of a data base;

When the translation finishes by the operation, it goes to the next step 5. If the translation request to another service process node is necessary, the process in the query side is carried out.

5) Generation of an response In the present embodiment, Response=(RESULT(translation response(ISDN number)).

6) Transmission of access end; In the present embodiment, Access end=(END(RESULT(translation result(ISDN number))).

The specific effects of the present invention are;

a) A data base stores only the local data of the users belonging to the local service area, and consequently, the capacity of the data base may be small. Therefore, the data management including the registration of a new data, and deletion of a data are simplified.

b) A service process node receives a service request from only the exchanges which belong to the local service area. Therefore, the load of the service process node is decreased as compared with a prior art in which only a single service process node is provided for the whole network. Further, the traffic between a service process node and the exchanges is decreased.

From the foregoing it will now be apparent that a new and improved service process system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A service process system, comprising:

a plurality of service areas, each of said service areas respectively having a service process node associated therewith, a data base associated therewith and operably connected to said associated service process node, at least one exchange device associated therewith and operably coupled to said service process node, and a plurality of user terminals associated therewith and operably coupled to said associated exchange device through a first communication line;

second communication lines operably coupling a plurality of said exchange devices within said service area; and third communication lines operably coupling a plurality of said process nodes associated with said plurality of service areas, wherein said service process node accesses said data base associated with said service area upon request by one of said user terminals, and obtains a response to a query by said one of said user terminals by reading out said data base associated with said service area, wherein said data base associated with said service area stores at least a table of information relating to said associated service area and other information relating to location of other service areas containing information not in said associated service area, wherein said service process node transfers said query to another one of said service process nodes when no response exists in said data base associated with said service area, and said service process node asks for a response to said query from said another one of said service process nodes, wherein said another one of said service process node directly accesses yet another service process node without directly accessing said service process node when said yet another service process node has said response to said query and when said another one of said service process node lacks said response, and wherein said another one of said service process node responds to said query through said third communication lines.

2. The service process system according to claim 1, wherein said another one of said service process node accesses yet another service process node having said response to said query when said another one of said service process node lacks said response.

* * * * *